US012424761B2

(12) United States Patent
Lin

(10) Patent No.: US 12,424,761 B2
(45) Date of Patent: *Sep. 23, 2025

(54) ANTENNA APPARATUS

(71) Applicant: RichWave Technology Corp., Taipei (TW)

(72) Inventor: Shih-Kai Lin, Taipei (TW)

(73) Assignee: RichWave Technology Corp., Taipei (TW)

( * ) Notice: Subject to any disclaimer, the term of this patent is extended or adjusted under 35 U.S.C. 154(b) by 133 days.

This patent is subject to a terminal disclaimer.

(21) Appl. No.: 18/353,125

(22) Filed: Jul. 17, 2023

(65) Prior Publication Data

US 2023/0369772 A1 Nov. 16, 2023

Related U.S. Application Data

(63) Continuation-in-part of application No. 17/565,457, filed on Dec. 30, 2021, now Pat. No. 11,764,477.

(30) Foreign Application Priority Data

Dec. 24, 2021 (TW) ................................ 110148774
May 22, 2023 (TW) ................................ 112118884

(51) Int. Cl.
*H01Q 13/18* (2006.01)
*H01Q 9/04* (2006.01)

(52) U.S. Cl.
CPC ........... *H01Q 13/18* (2013.01); *H01Q 9/0457* (2013.01)

(58) Field of Classification Search
CPC ............................. H01Q 9/045; H01Q 9/0457
See application file for complete search history.

(56) References Cited

U.S. PATENT DOCUMENTS 6,975,276 B2 * 12/2005 Brown ................. H01Q 9/0457 343/789
2008/0218417 A1 9/2008 Gillette
2014/0118206 A1 5/2014 Hendry et al.

FOREIGN PATENT DOCUMENTS

CN 102456945 5/2012
CN 104885291 9/2015
(Continued)

OTHER PUBLICATIONS

"Notice of allowance of Taiwan Counterpart Application", issued on Apr. 30, 2024, p. 1-p. 4.
(Continued)

*Primary Examiner* — Daniel Munoz
(74) *Attorney, Agent, or Firm* — JCIPRNET

(57) ABSTRACT

An antenna apparatus is provided. The antenna apparatus includes a cavity element, a radiating element, and a feeding element. The cavity element includes an opening. The radiating element is located within the opening and disposed at a conductive layer. An outline of the radiating element and the opening form a surrounding slot. An imagining rectangle has four sides respectively abutted against an external outline of the surrounding slot. The feeding element is disposed at the same conductive layer. The feeding element includes a first section and a second section. A coupling distance is provided between the first section and the radiating element. A tail end of the first section is an open circuit. A shift distance is provided between the second section and a central line of the imagining rectangle.

19 Claims, 19 Drawing Sheets

(56) References Cited

FOREIGN PATENT DOCUMENTS

| | | |
|---|---|---|
| CN | 106058447 | 10/2016 |
| CN | 103959557 | 12/2016 |
| CN | 106329145 | 1/2017 |
| CN | 112838360 | 5/2021 |
| TW | 200835054 | 8/2008 |
| TW | 201125211 | 7/2011 |

OTHER PUBLICATIONS

"Office Action of China Counterpart Application", issued on Jul. 22, 2025, p. 1-p. 8.

* cited by examiner

ANTENNA APPARATUS

CROSS-REFERENCE TO RELATED APPLICATION

This application is a continuation-in-part application of and claims the priority benefit of U.S. application Ser. No. 17/565,457, filed on Dec. 30, 2021, which claims the priority benefit of Taiwan application serial no. 110148774, filed on Dec. 24, 2021. This application also claims the priority benefit of Taiwan application serial no. 112118884, filed on May 22, 2023. The entirety of each of the above-mentioned patent applications is hereby incorporated by reference herein and made a part of this specification.

BACKGROUND

Technical Field

The disclosure relates to an antenna technology, and particularly relates to a non-narrowband antenna apparatus.

Description of Related Art

Antenna design may affect antenna performance. Bandwidth is one of indicators of the antenna performance. In order to meet a requirement of non-narrowband, most antenna frameworks are complicated in design, difficult in manufacturing process and high in cost.

SUMMARY

An embodiment of the disclosure provides an antenna apparatus. The antenna apparatus includes (but is not limited to) a cavity element, a radiating element, and a feeding element. The cavity element includes an opening. The radiating element is located within the opening and disposed at a conductive layer. An outline of the radiating element and the opening form a surrounding slot. An external outline of the surrounding slot is configured to define an imagining rectangle, and the imagining rectangle has four sides respectively abutting against the external outline of the surrounding slot. The feeding element is disposed at the same conductive layer. The feeding element includes a first section and a second section. The first section is located within the opening, and a coupling distance is provided between the first section and the radiating element. A tail end of the first section is an open circuit, or is separated from the radiating element and the external outline of the surrounding slot. The second section is located within the opening, and a shift distance is provided between the second section and a central line of the imagining rectangle.

To make the aforementioned more comprehensible, several embodiments accompanied with drawings are described in detail as follows.

DESCRIPTION OF THE EMBODIMENTS

Figure 1A:
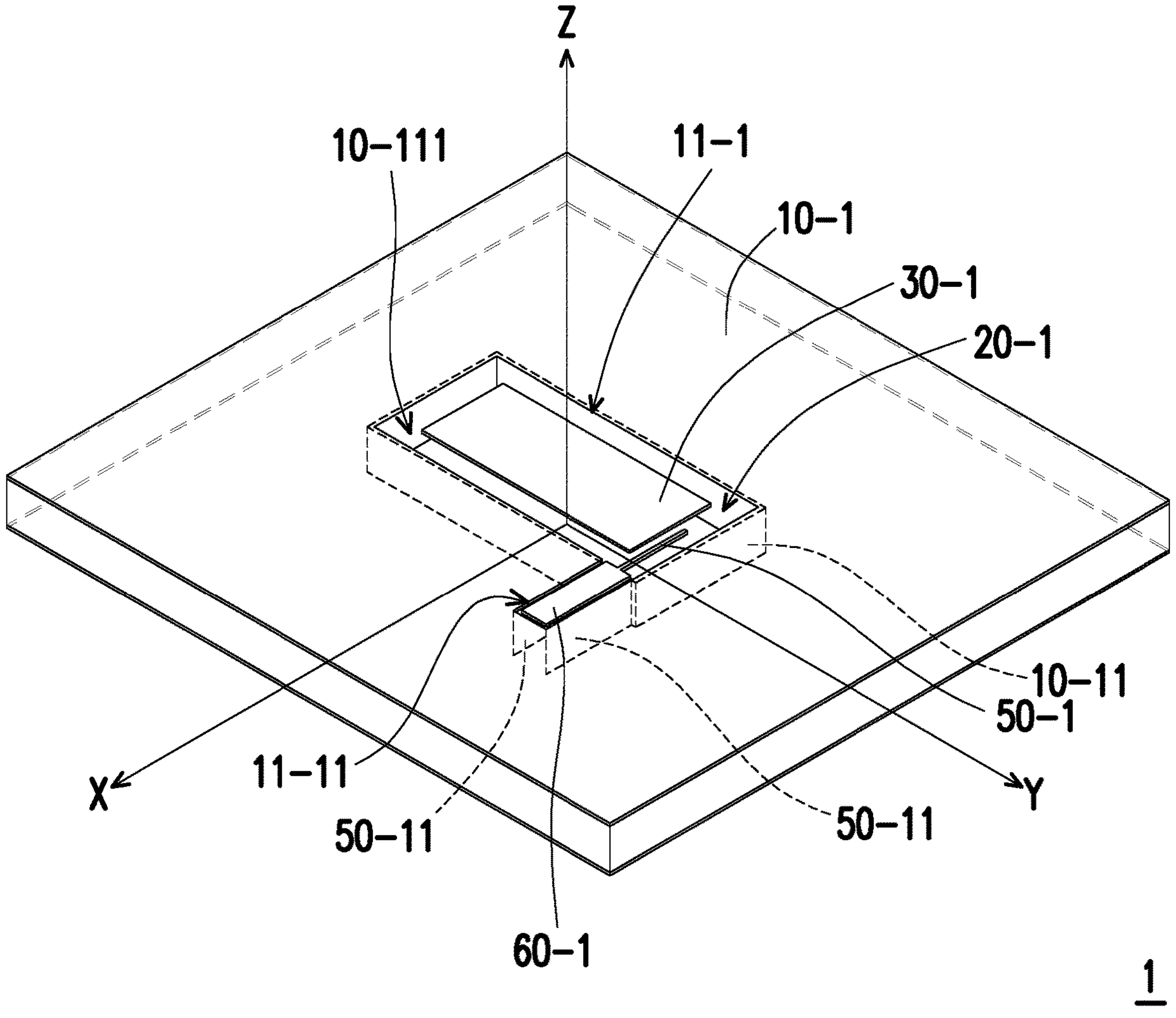
FIG. 1A is a perspective three-dimensional view of an antenna apparatus according to a first embodiment of the disclosure.
Figure 1B:
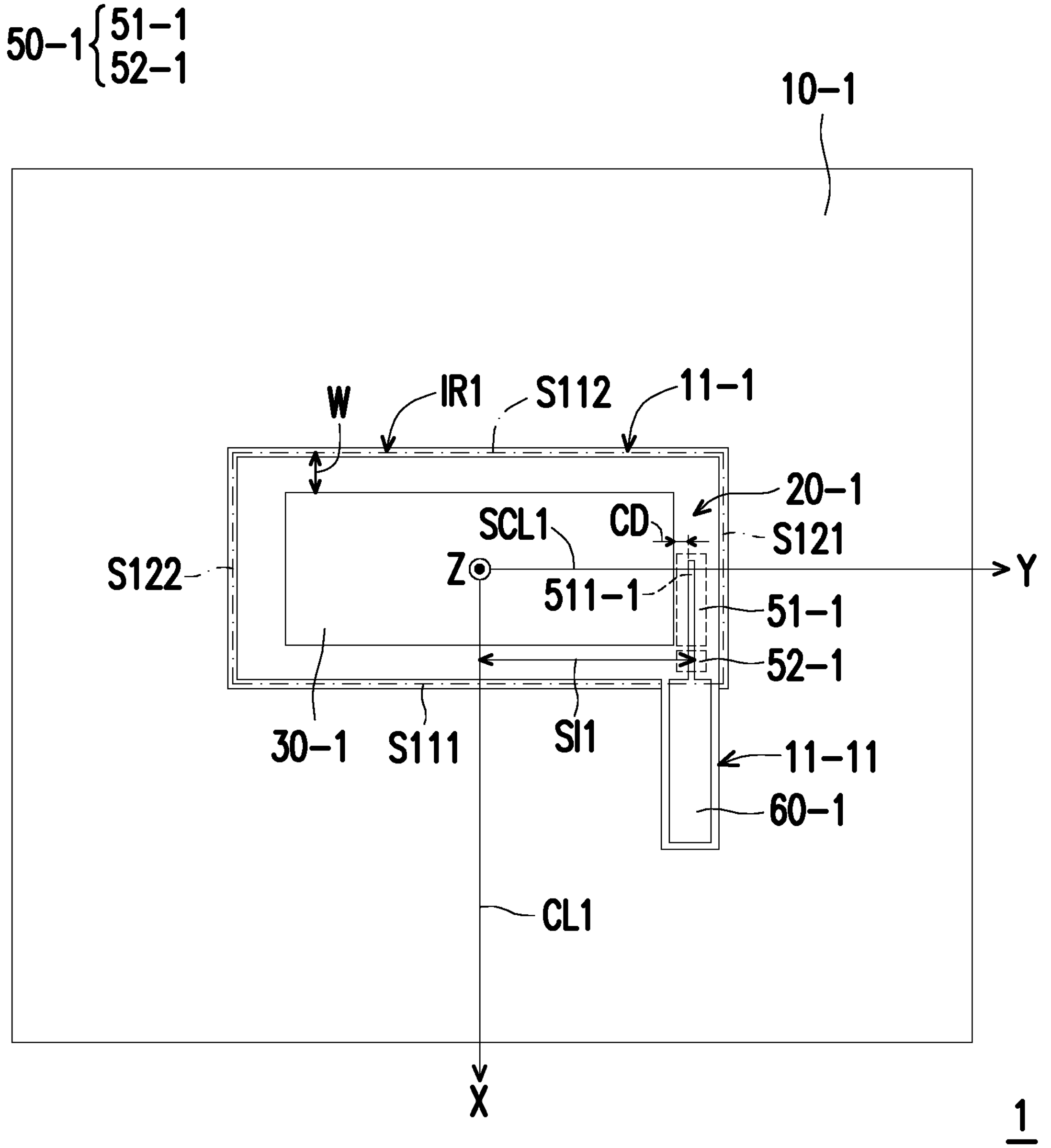
FIG. 1B is a top view of the antenna apparatus according to the first embodiment of the disclosure.
Figure 1C:
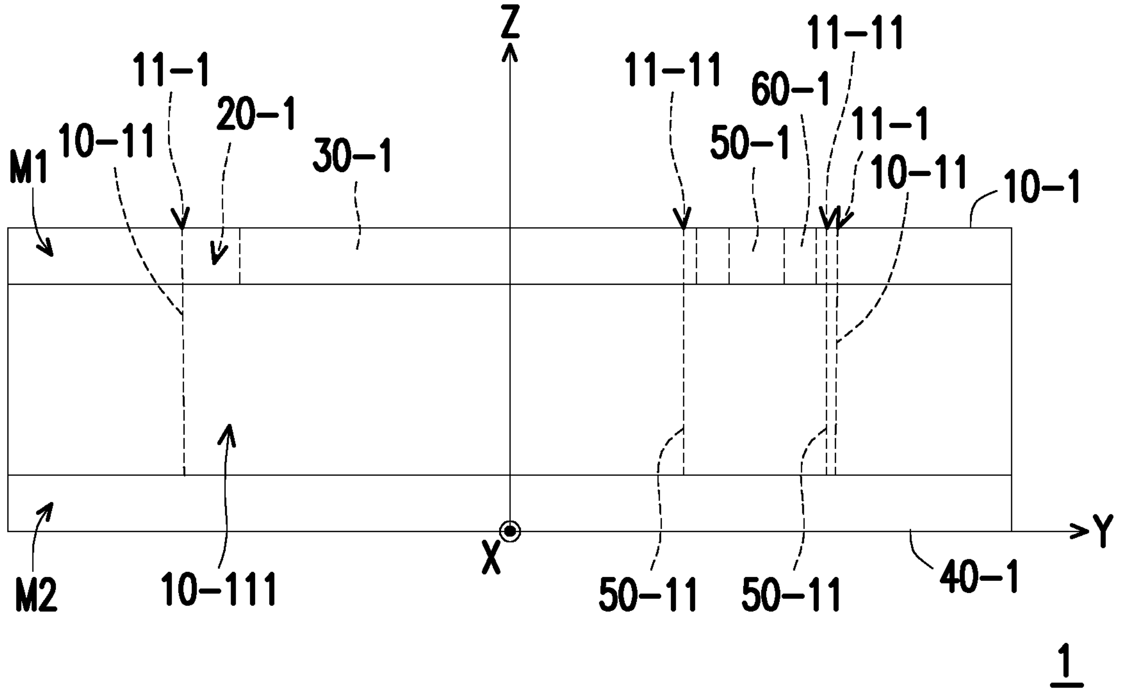
FIG. 1C is a perspective side view of the antenna apparatus according to the first embodiment of the disclosure.

FIG. 1A is a perspective three-dimensional view of an antenna apparatus 1 according to a first embodiment of the disclosure, FIG. 1B is a top view of the antenna apparatus 1 according to the first embodiment of the disclosure, and FIG. 1C is a perspective side view of the antenna apparatus 1 according to the first embodiment of the disclosure. Referring to FIG. 1A to FIG. 1C, the antenna apparatus 1 includes a cavity element 10-1, a radiating element 30-1 and a feeding element 50-1.

The cavity element 10-1 includes an opening 11-1. Further, the cavity element 10-1 includes a cavity 10-111 and an element forming the cavity 10-111, where the cavity 10-111 is formed from the opening 11-1 toward a negative direction of a Z-axis. As shown in FIG. 1A and FIG. 1B, the cavity 10-111 is, for example, a rectangular cavity, but the shape of the cavity element 10-1 and the included cavity 10-111 is not limited thereto. The opening 11-1 is, for example, rectangular. It should be noted that, in some embodiments, the shape of a part of cross-section of the cavity 10-111 of the cavity element 10-1 may be different from a shape of the opening 11-1. For example, the shape of the cross-section of the cavity 10-111 is oval, but the shape of the opening 11-1 is rectangular.

From the point of view of FIG. 1C (for example, a Y-Z plane), a top side of the cavity element 10-1 is attached to a conductive layer M1, and the bottom side of the cavity element 10-1 is attached to a conductive layer M2. It should be noted that the conductive layers M1 and M2 are, for example, parallel to an X-Y plane. In other embodiments, the conductive layers M1 and M2 may also be curved structures or structures that form partly concave or partly convex surfaces, but the disclosure is not limited thereto.

The radiating element 30-1 may be a patch or a microstrip, or other radiators. The radiating element 30-1 is located in the opening 11-1 and disposed at the conductive layer M1. An outline of the radiating element 30-1 has the same geometric shape as the opening 11-1. Namely, the radiating element 30-1 is rectangular. From the point of view of FIG. 1B, an area of the radiating element 30-1 is smaller than an area of the opening 11-1. In addition, the outline of the radiating element 30-1 and the opening 11-1 form a surrounding slot 20-1 (or referred to as a slot-ring).

The feeding element 50-1 is also disposed at the conductive layer M1. Namely, both the radiating element 30-1 and the feeding element 50-1 are all located on the same conductive layer M1. The feeding element 50-1 may be a microstrip line, a stub or other transmission conductors.

From the point of view of FIG. 1B, the feeding element 50-1 includes (but is not limited to) sections 51-1, 52-1. The sections 51-1, 52-1 form a straight shape (or a straight-shaped stub).

From the point of view of FIG. 1B, the section 51-1 is located in the opening 11-1, and has a coupling distance CD with the radiating element 30-1. Thereby, the feeding element 50-1 may feed radio signals into or out of the radiating element 30-1 in an electric field coupling manner. A tail end 511-1 of the section 51-1 is an open circuit, or is separated from the radiating element 30-1 and an external outline of the surrounding slot 20-1.

From the point of view of FIG. 1B, the section 52-1 is located in the opening 11-1. In addition, a shift distance SI1 is provided between the section 52-1 and the central line CL1 of the imagining rectangle IR1. Namely, relative to the radiating element 30-1, the feeding element 50-1 is not for centered feeding. It should be noted that the external outline of the surrounding slot 20-1 may be used to define the imagining rectangle IR1 and define the central line of the imagining rectangle IR1. The imagining rectangle IR1 has four sides (for example, opposite sides S111, S112, S121, S122) respectively abutting against the external outline of the surrounding slot 20-1. The imagining rectangle IR1 is the smallest rectangle that may cover the external outline of the surrounding slot 20-1 (i.e., an outline of the opening 11-1) on the X-Y plane, i.e., the rectangle with the smallest area among all of the rectangles that may cover the external outline of the surrounding slot 20-1. Namely, a region where the imagining rectangle IR1 is projected to the conductive layer M1 may cover the external outline of the surrounding slot 20-1 and is the one with the smallest area. For example, it is assumed that the external outline of the surrounding slot 20-1 is also a rectangle, the imagining rectangle IR1 also coincides with the rectangle of the external outline of the surrounding slot 20-1. It is assumed that the external outline of the surrounding slot 20-1 is an ellipse, lengths of a long side and a short side of the imagining rectangle IR1 are also equal to lengths of a major axis and a minor axis of the ellipse.

In the embodiment, the antenna apparatus 1 further includes a transmission element 60-1. The transmission element 60-1 includes, for example, a microstrip line, an external wire, a coplanar waveguide (CPW), a varied grounded CPW thereof, a slot line, a vertical layer-through transmission line or other transmission lines that may be realized in the structure between the feeding element 50-1 and the matched system elements. In the embodiment, the cavity element 10-1 further includes an opening extending portion 11-11. The opening extending portion 11-11 communicates with the opening 11-1. The opening extending portion 11-11 is an opening extending outward on the X-Y plane from one side of the opening 11-1. The opening extending portion 11-11 is, for example, rectangular, but the shape thereof has other variations. The transmission element 60-1 is coupled to the section 52-1 of the feeding element 50-1, and the transmission element 60-1 is located in the opening extending portion 11-11. Namely, the opening extending portion 11-11 is used to accommodate the transmission element 60-1. A shape of the transmission element 60-1 may be the same as the shape of the opening extending portion 11-11, for example, a rectangle, but the disclosure is not limited thereto. A length of the section where the opening 11-1 communicates with the opening extending portion 11-11 is slightly longer than a length of one side of the transmission element 60-1 coupled to the section 52-1, while the shape of the external outline of the surrounding slot 20-1 is substantially the same as the shape of the opening 11-1. In an embodiment, the variation in the shape of the transmission element 60-1 is used for impedance matching. In addition, in the embodiment, a depth of a space for accommodating the transmission element 60-1 in the Z-axis direction may be the same as a depth of the cavity 10-111 in the Z-axis direction, which is more convenient in manufacturing; but in other embodiments, the depth of the space for accommodating the transmission element 60-1 in the Z-axis direction may be different from the depth of the cavity 10-111 in the Z-axis direction, so as to increase arrangement flexibility of other surrounding elements.

In an embodiment, from the point of view of FIG. 1B, the imagining rectangle IR1 includes two opposite sides S111, S112. The central line CL1 is formed at a center of any one of the opposite sides S111, S112, i.e., the central line CL1 is a perpendicular bisector of the opposite sides S111 and S112. The section 52-1 extends into the opening 11-1 from the opposite side S111, and the tail end 511-1 of the section 51-1 is not connected to the opposite side S112 (i.e., an open circuit is formed). In an embodiment, the shift distance SI1 is greater than or equal to one-sixteenth of the length of the opposite sides S111 and S112 to provide a suitable non-narrowband range. For example, if the shift distance SI1 is increased from one-sixteenth of the length of the opposite sides S111 and S112 to one-fourth or even greater, the non-narrowband range provided by the antenna apparatus 1 will be increased from a dual-bandwidth range to a wide-band range.

In an embodiment, from the point of view of FIG. 1B, the shortest linear distance W from the external outline of the surrounding slot 20-1 to an external outline of the radiating element 30-1 may define one or multiple widths of the surrounding slot 20-1. The greatest of one or multiple widths of the surrounding slot 20-1 is less than a half of a wavelength of a radio signal of the antenna apparatus 1. However, in other embodiments, the greatest of one or multiple widths of the surrounding slot 20-1 may also be a quarter of the wavelength, one-eighth of the wavelength or other lengths.

In an embodiment, from the point of view of FIG. 1B, the imagining rectangle IR1 further includes the opposite sides S121, S122. The tail end 511-1 of the section 51-1 may exceed a central line SCL1 of the imagining rectangle IR1, but the tail end 511-1 is still open circuit (i.e., not connected to the opposite side S112) or separated from the radiating element 30-1 and the external outline of the surrounding slot 20-1. The central line SCL1 is formed at a center of any one of the opposite sides S121, S122. Namely, the central line SCL1 is a perpendicular bisector of the opposite sides S121 and S122. In an embodiment, the lengths of the opposite sides S111 and S112 are greater than the lengths of the opposite sides S121 and S122, i.e., the section 52-1 may extend into the opening 11-1 from the long side (the opposite side S111) of the imagining rectangle IR1, and the central line CL1 may be a perpendicular bisector of the long side of the rectangle IR1.

In other embodiments, the tail end 511-1 of the section 51-1 may also be within the central line SCL1 of the imagining rectangle IR1.

In addition, from the point of view of FIG. 1C, the antenna apparatus 1 further includes a ground portion 40-1. The ground portion 40-1 is disposed at the conductive layer M2 parallel to the conductive layer M1. In addition, the ground portion 40-1 is located at a bottom side of the cavity element 10-1. In an embodiment, the cavity element 10-1 is a conductor coupled to the ground portion 40-1.

In an embodiment, from the point of view of FIG. 1B and FIG. 1C, the cavity element 10-1 is defined by at least one conductive wall 10-11 surrounding the radiating element 30-1. Furthermore, the at least one conductive wall 10-11 defines an interior and an exterior of the cavity 10-111 of the cavity element 10-1. In the embodiment, the at least one conductive wall 10-11 is connected between the conductive layer M1 and the conductive layer M2. In addition, as shown in FIG. 1A and FIG. 1C, the space for accommodating the transmission element 60-1 may be defined by the at least one conductive wall 50-11, but it should be noted that the space for accommodating the transmission element 60-1 must be communicated with the cavity 10-111, so that the transmission element 60-1 is coupled to the section 52-1 of the feeding element 50-1. In this way, in the embodiment, the plane facing a positive direction of the X-axis is not provided with the conductive wall 50-11 to avoid blocking the transmission element 60-1.

Figure 1D:
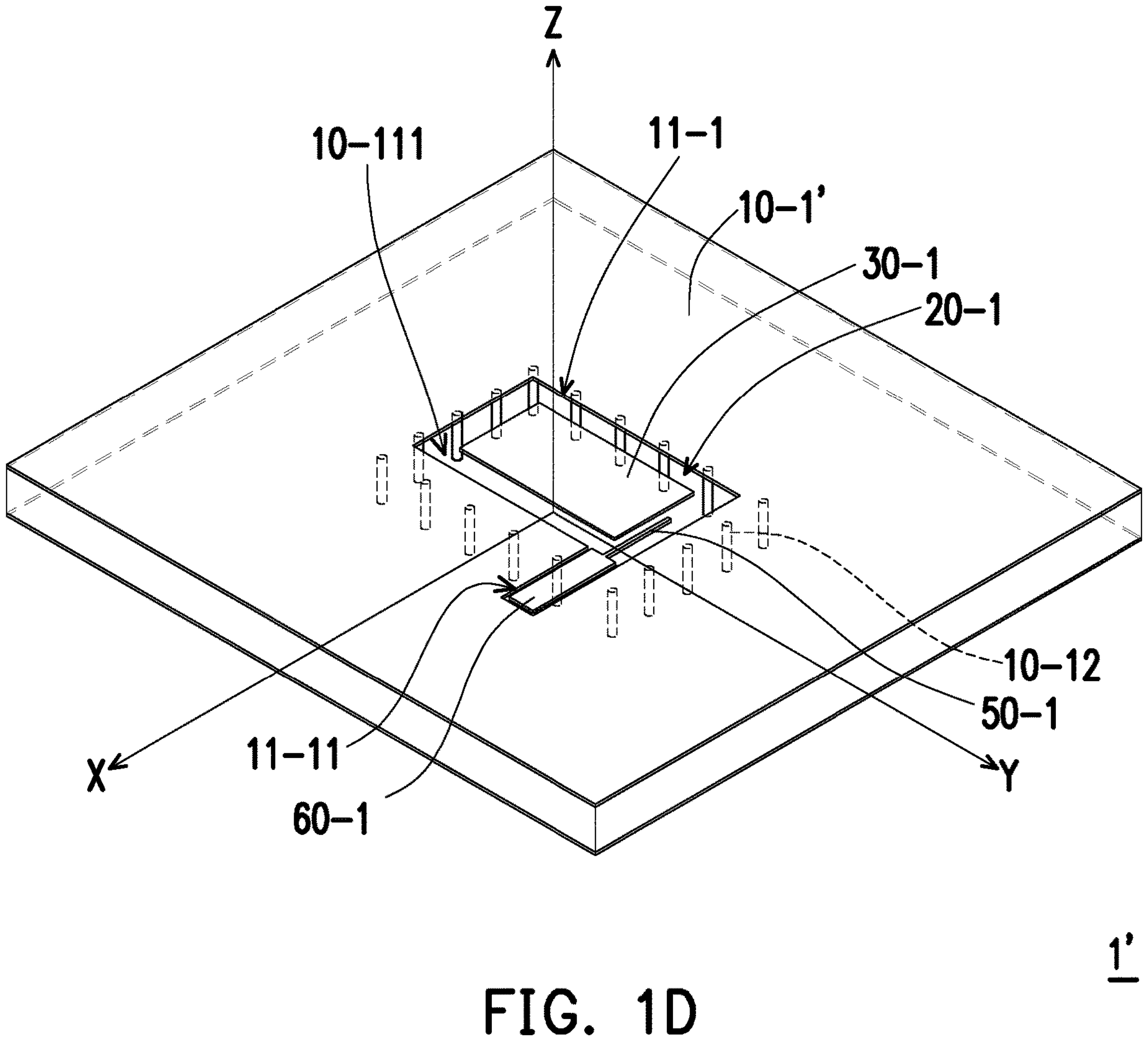
FIG. 1D is a perspective three-dimensional view of an antenna apparatus according to a second embodiment of the disclosure.
Figure 1E:
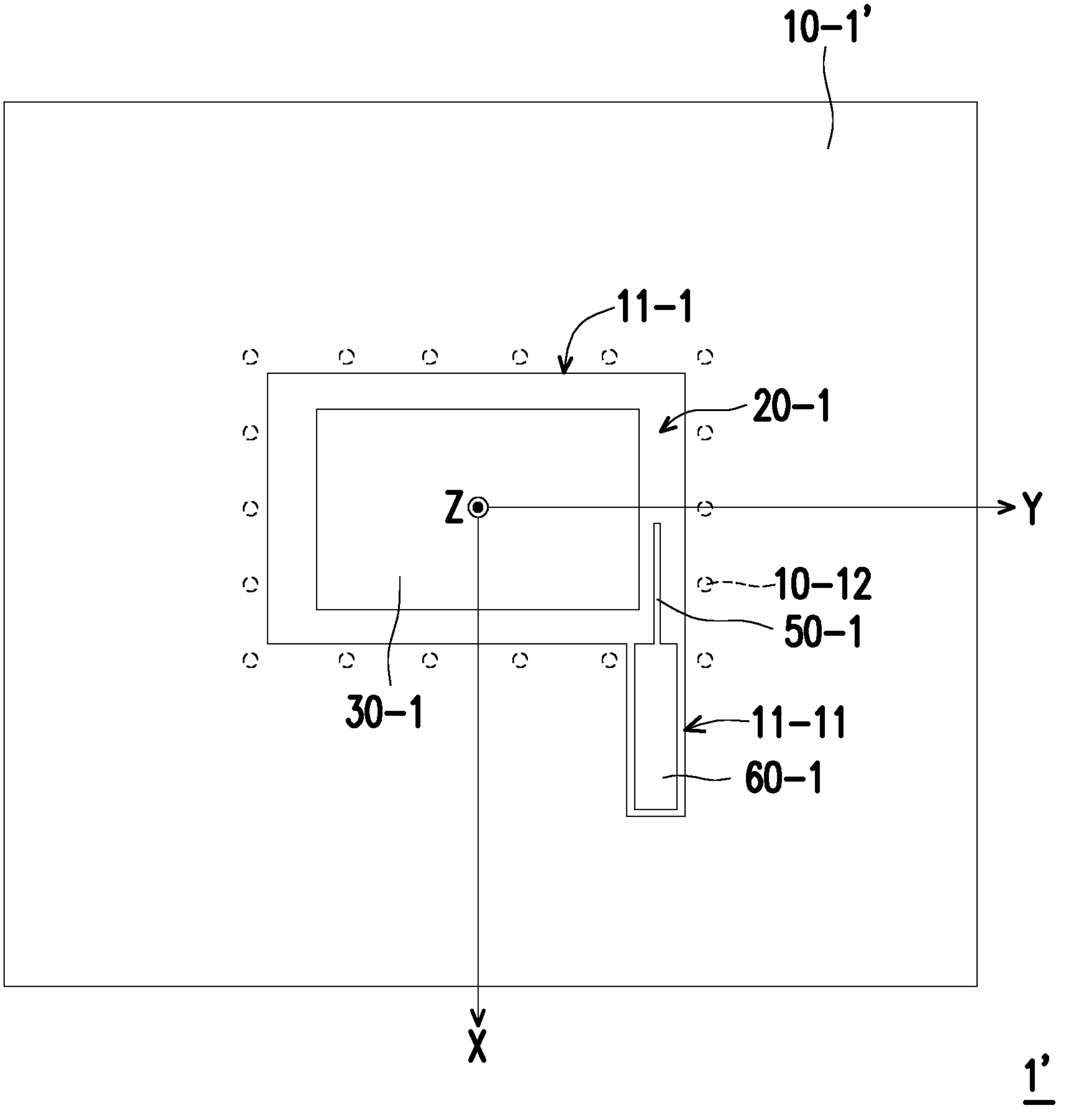
FIG. 1E is a perspective top view of the antenna apparatus according to the second embodiment of the disclosure.
Figure 1F:
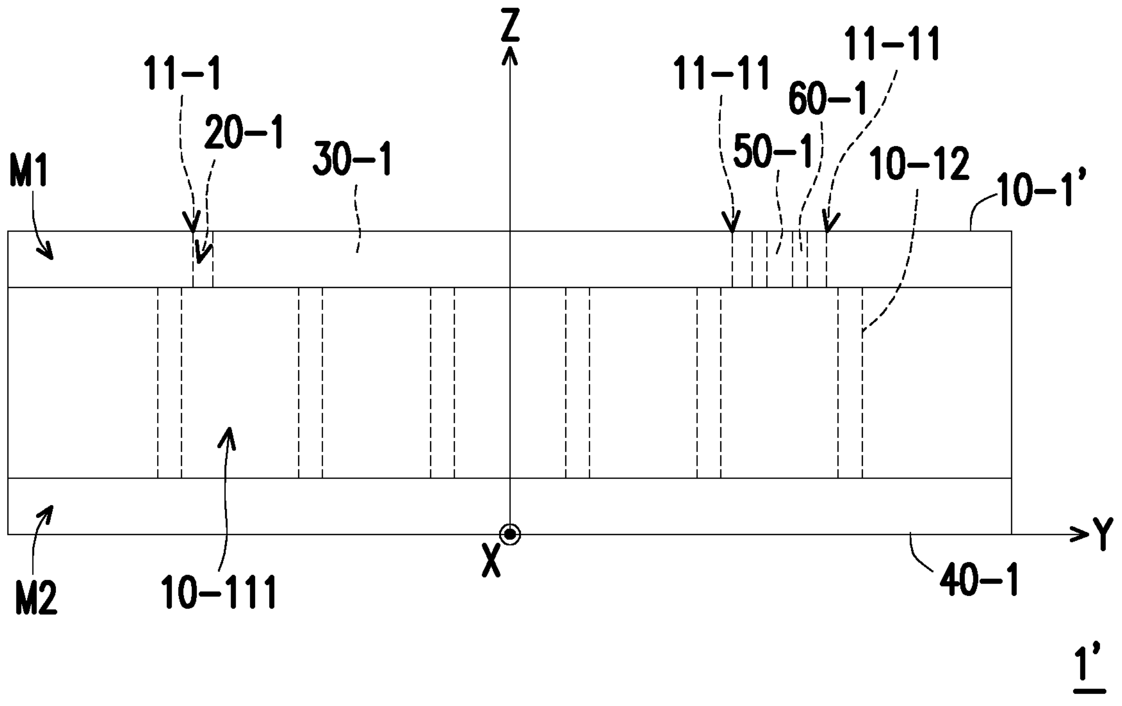
FIG. 1F is a perspective side view of the antenna apparatus according to the second embodiment of the disclosure.

FIG. 1D is a perspective three-dimensional view of an antenna apparatus 1' according to a second embodiment of the disclosure, FIG. 1E is a perspective top view of the antenna apparatus according to the second embodiment of the disclosure, and FIG. 1F is a perspective side view of the antenna apparatus according to the second embodiment of the disclosure. Referring to FIG. 1D to FIG. 1F, a difference from the antenna apparatus 1 of the first embodiment is that a cavity element 10-1' is defined by multiple conductive vias 10-12 surrounding the radiating element 30-1 and parallel to the Z-axis. Further, the conductive vias 10-12 define the interior and exterior of the cavity 10-111 of the cavity element 10-1', for example, multiple conductive vias 10-12 stand upright and are arranged along the shape of the opening 11-1. In addition, the conductive vias 10-12 are connected between the conductive layer M1 and the conductive layer M2, and positions where the conductive vias 10-12 are connected to the conductive layer M1 may be, for example, aligned with the outline of the opening 11-1. However, in other embodiments, the conductive vias 10-12 may also be arranged at positions with a certain distance from the outline of the opening 11-1, as long as the positions where the conductive vias 10-12 are connected to the conductive layer M1 surround the surrounding slot 20-1. Furthermore, in the embodiment, a shape formed by the arrangement of the conductive vias 10-12 may be the same as the shape of the opening 11-1; but in other embodiments, the shape formed by the arrangement of the conductive vias 10-12 may be different from the shape of the opening 11-1.

The feeding element 50-1 is, for example, configured to transmit radio signals, and the shortest distance between the conductive vias 10-12 is less than or equal to ½ of a wavelength of the radio signal, so as to provide an acceptable signal isolation effect. In an embodiment, the shortest distance between the conductive vias 10-12 is less than or equal to one-eighth of the wavelength of the radio signal, so as to provide a better signal isolation effect.

Figure 1G:
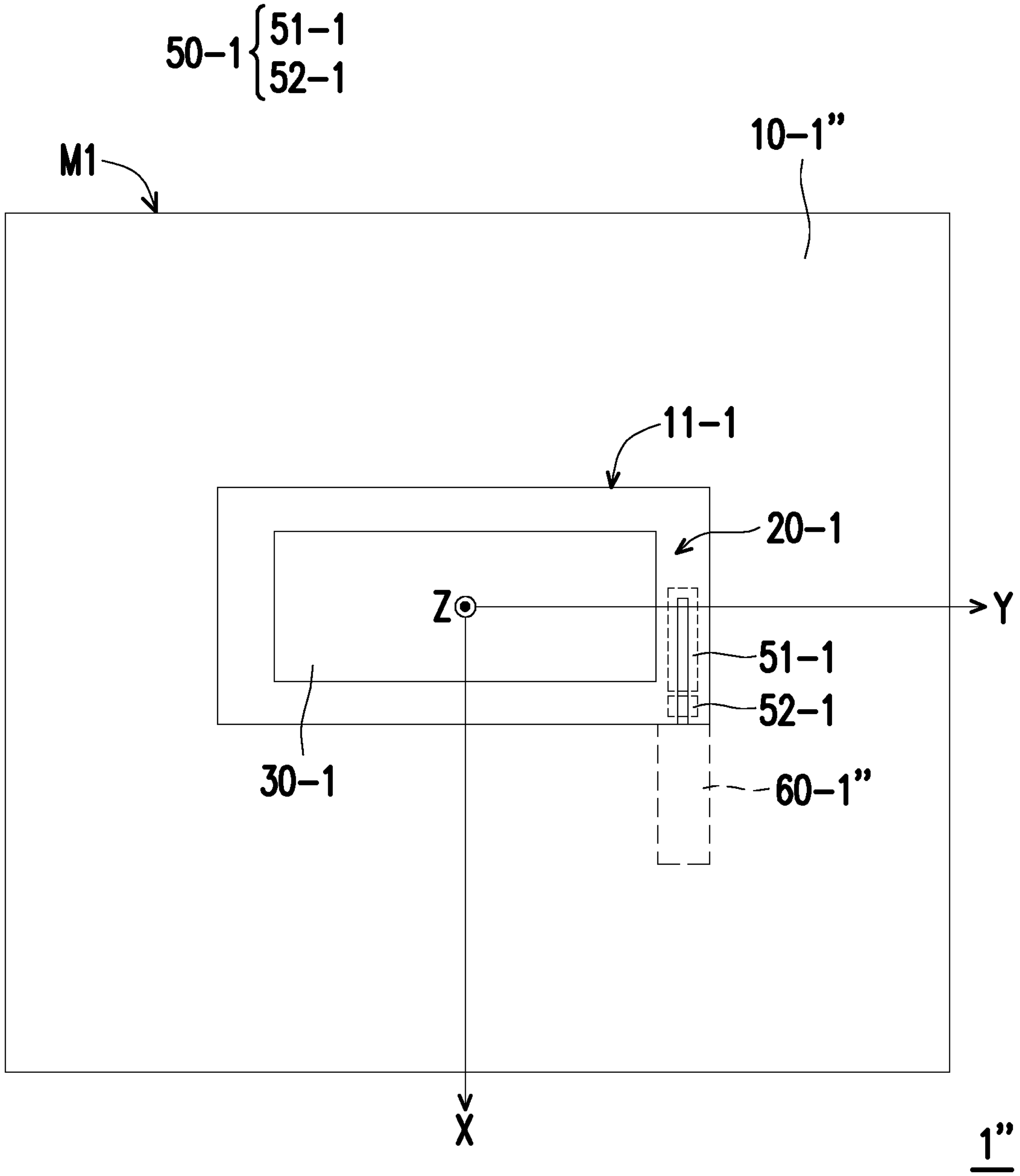
FIG. 1G is a perspective top view of an antenna apparatus according to a third embodiment of the disclosure.
Figure 1H:
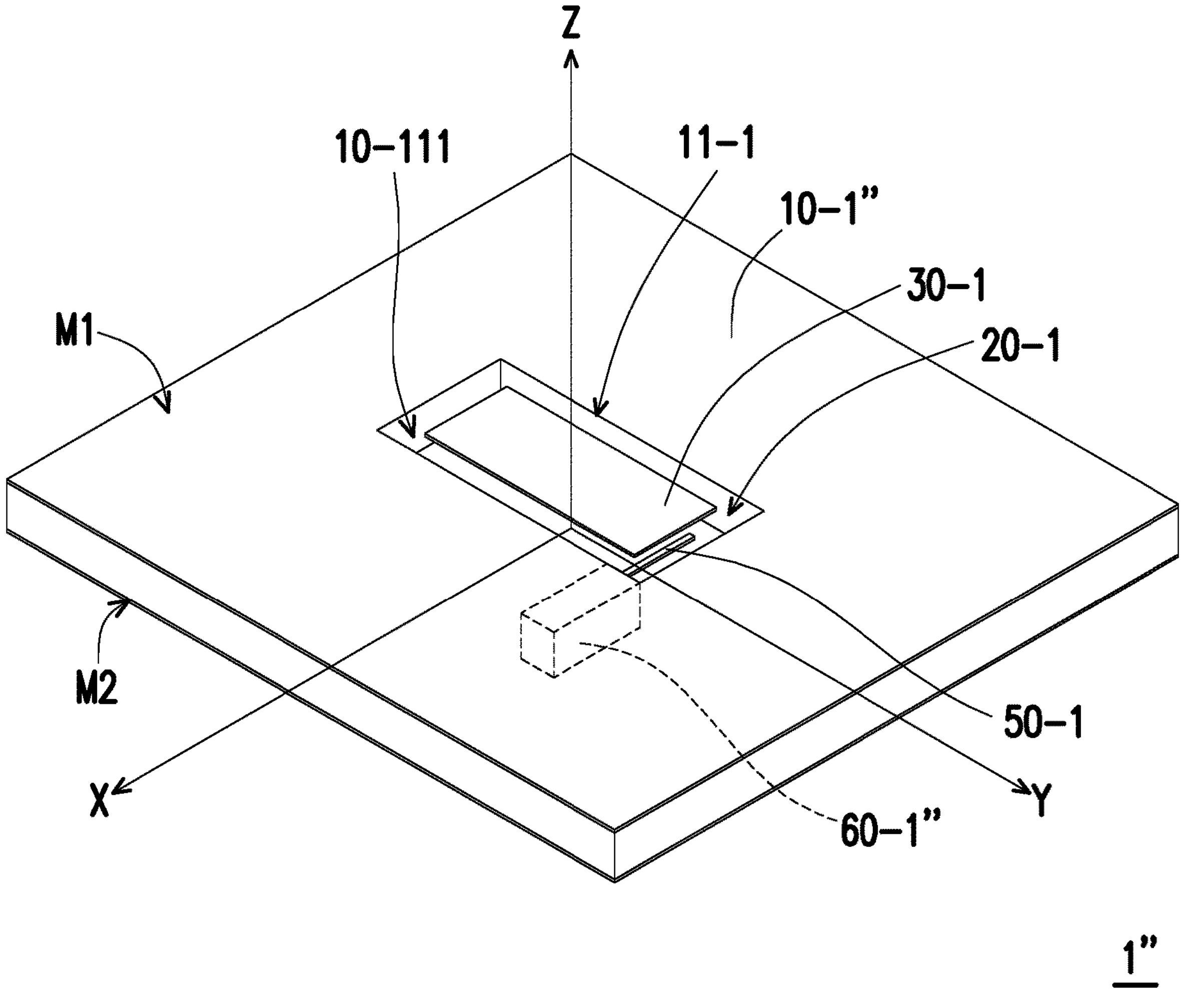
FIG. 1H is a perspective partial three-dimensional view of the antenna apparatus according to the third embodiment of the disclosure.

FIG. 1G is a perspective top view of an antenna apparatus 1" according to a third embodiment of the disclosure, and FIG. 1H is a perspective side view of the antenna apparatus 1" according to the third embodiment of the disclosure. Referring to FIG. 1G and FIG. 1H, a difference from the antenna apparatus 1 of the first embodiment is that a cavity element 10-1" does not include the opening extending portion 11-11 and the conductive wall 50-11 of the first embodiment. In addition, the antenna apparatus 1" includes a transmission element 60-1", and the transmission element 60-1" is coupled to the section 52-1 of the feeding element 50-1, but the structure of the transmission element 60-1" is different from that of the transmission element 60-1 in the first embodiment. In the embodiment, the transmission element 60-1" includes a part of metal of the conductive layer M1, for example, the transmission element 60-1" is directly formed by a part of metal and dielectric of the conductive layer M1. In other embodiments, the conductive layer M2 in the area below the transmission element 60-1" may not be provided with metal (such as the ground portion 40-1). In other embodiments, the transmission element 60-1" may also include a part of metal of the conductive layer M1, a part of metal and dielectric of the conductive layer M2.

Figure 1I:
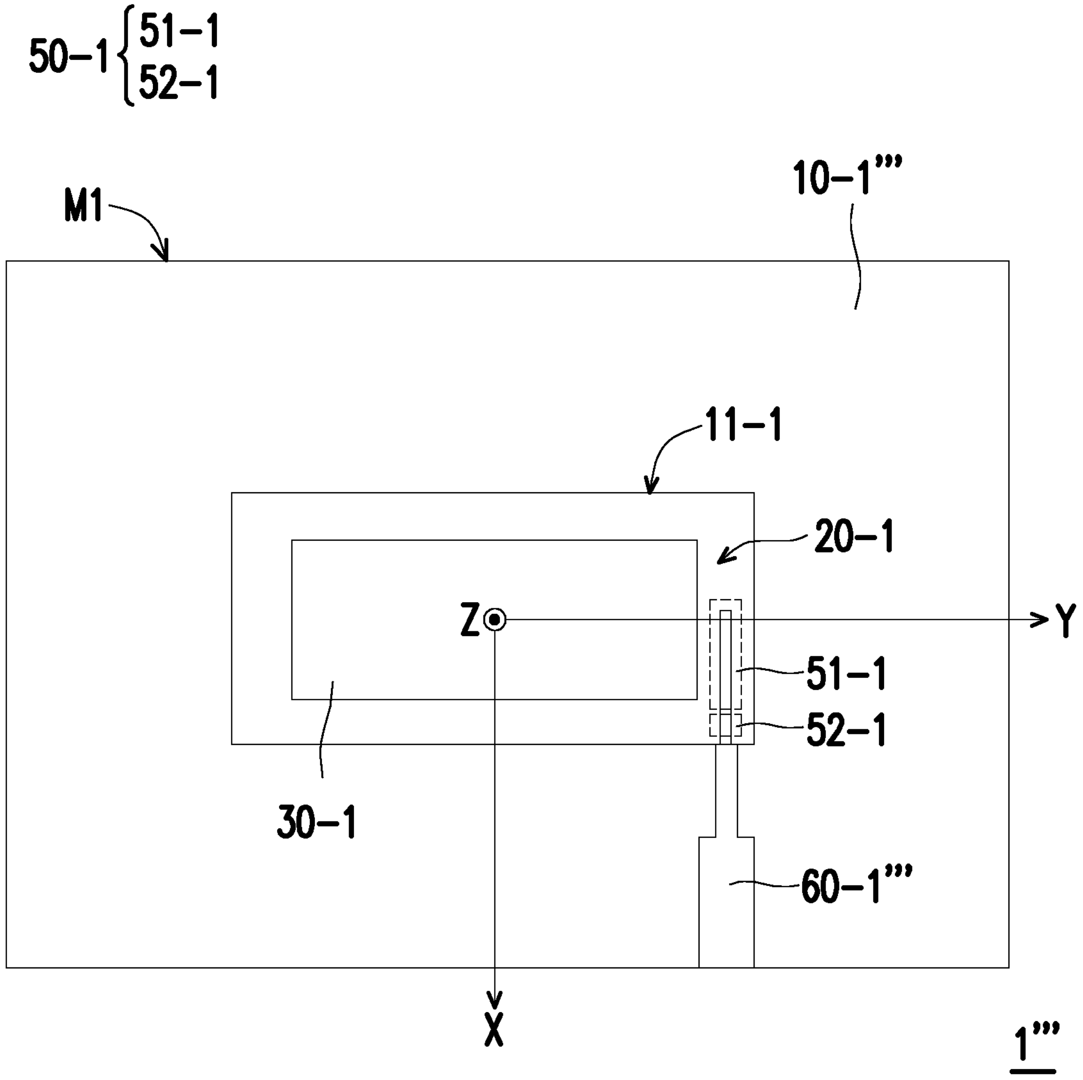
FIG. 1I is a top view of an antenna apparatus according to a fourth embodiment of the disclosure.
Figure 1J:
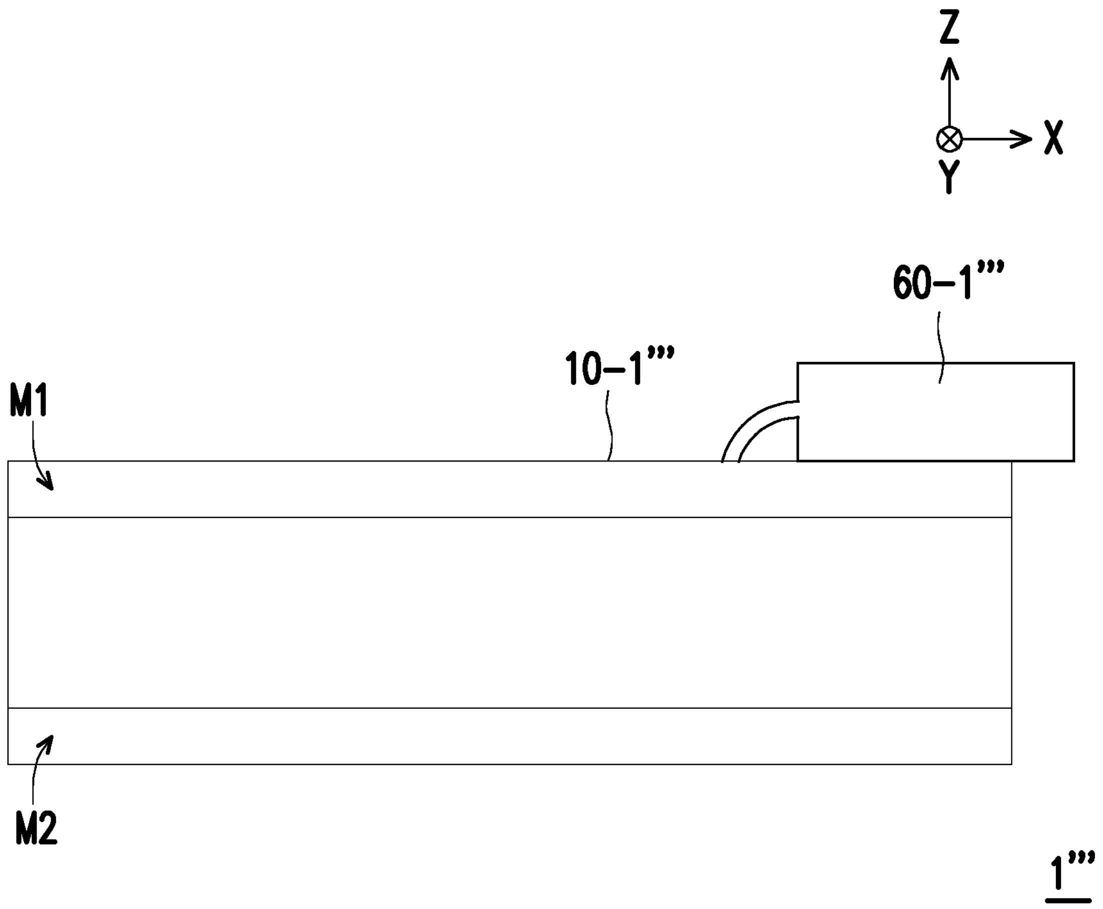
FIG. 1J is a side view of the antenna apparatus according to the fourth embodiment of the disclosure.

FIG. 1I is a top view of an antenna apparatus 1'" according to a fourth embodiment of the disclosure, and FIG. 1J is a side view of the antenna apparatus 1'" according to the fourth embodiment of the disclosure. Referring to FIG. 1I and FIG. 1J, a difference from the antenna apparatus 1 of the first embodiment is that a cavity element 10-1'" does not include the opening extending portion 11-11 and the conductive wall 50-11 of the first embodiment. In addition, the antenna apparatus 1'" includes a transmission element 60-1'", which is coupled to the section 52-1 of the feeding element 50-1, but the structure of the transmission element 60-1'" is different from that of the transmission element 60-1 of the first embodiment. The transmission element 60-F" is disposed outside the cavity element 10-1'". In the embodiment, the transmission element 60-1'" is, for example, disposed above the conductive layer M1, and a coaxial cable may be used to implement the transmission element 60-1'".

Figure 2A:
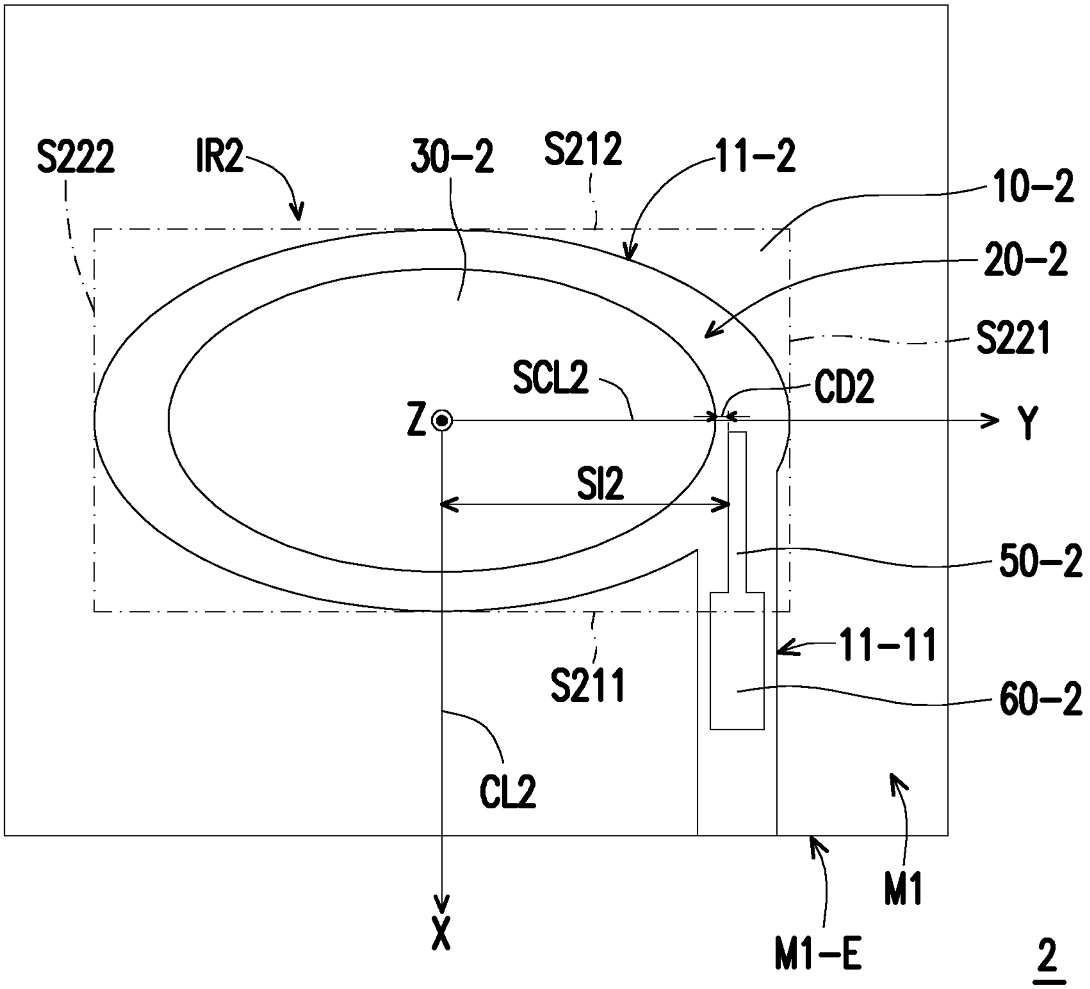
FIG. 2A is a top view of an antenna apparatus according to a fifth embodiment of the disclosure.
Figure 2B:
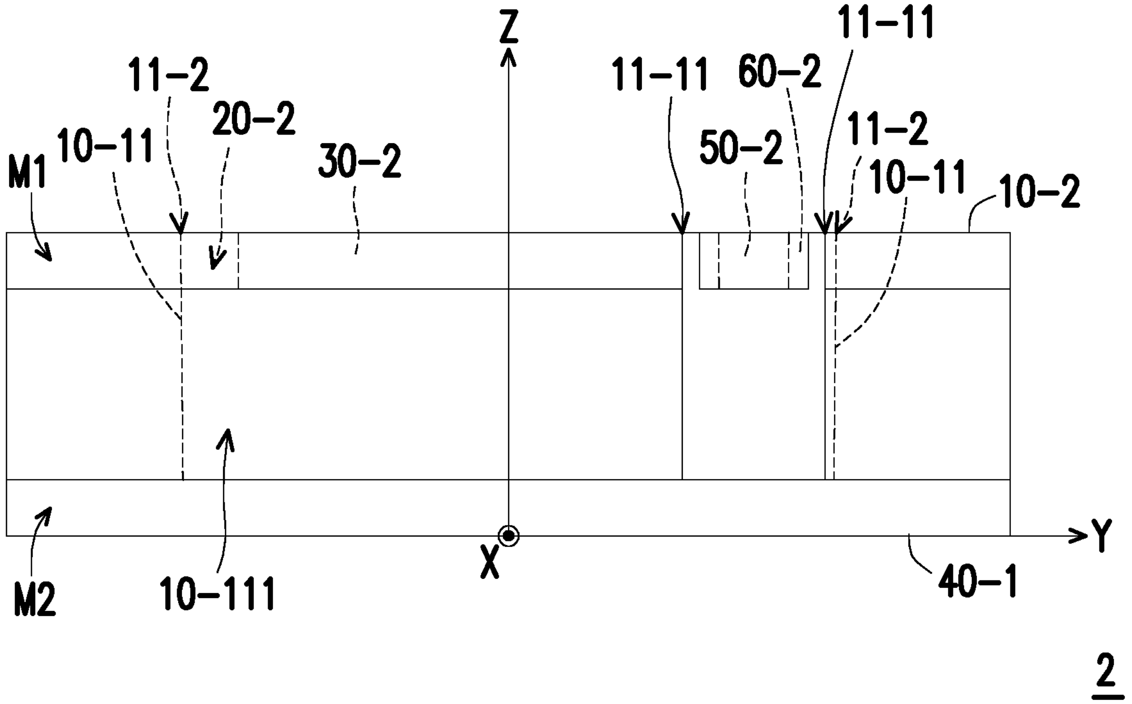
FIG. 2B is a perspective side view of the antenna apparatus according to the fifth embodiment of the disclosure.

FIG. 2A is a top view of an antenna apparatus 2 according to a fifth embodiment of the disclosure, and FIG. 2B is a perspective side view of the antenna apparatus 2 according to the fifth embodiment of the disclosure. Referring to FIG. 2A and FIG. 2B, the antenna apparatus 2 includes a cavity element 10-2, a radiating element 30-2 (disposed at the conductive layer M1) and a feeding element 50-2 (disposed at the conductive layer M1). In addition, the antenna apparatus 2 may further include a transmission element 60-2. A difference between the embodiment and the first embodiment is that an outline of the radiating element 30-2 and a geometric shape of the opening 11-2 are elliptical.

Similarly, the outline of the radiating element 30-2 and the opening 11-2 form a surrounding slot 20-2. A coupling distance CD2 is provided between the feeding element 50-2 and the radiating element 30-2 on the X-Y plane. Two sets of opposite sides S211, S212, S221, S222 of the imagining rectangle respectively abut against an external outline of the surrounding slot 20-2. A shift distance SI2 is provided between the feeding element 50-2 and a central line CL2 of the imagining rectangle IR2. Furthermore, a tail end of the feeding element 50-2 does not exceed the other central line SCL2 of the imagining rectangle IR2. Moreover, the opening extending portion 11-11 of the embodiment shown in FIG. 2A and FIG. 2B may extend to, for example, an edge M1-E of the conductive layer M1 to provide flexibility in configuration of the transmission line of the feeding element 50-2.

Figure 3:
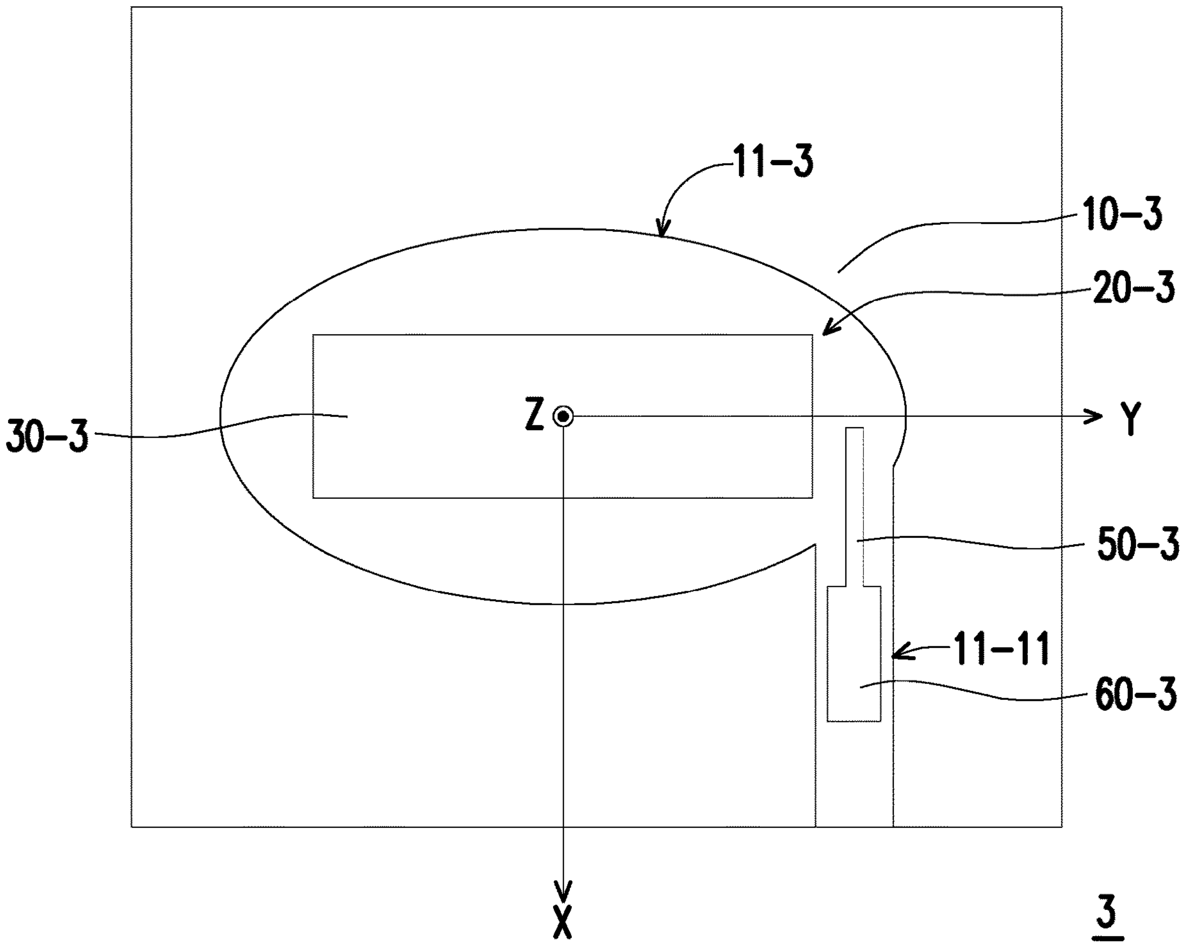
FIG. 3 is a top view of an antenna apparatus according to a sixth embodiment of the disclosure.

FIG. 3 is a top view of an antenna apparatus 3 according to a sixth embodiment of the disclosure. Referring to FIG. 3, the antenna apparatus 3 includes a cavity element 10-3, a radiating element 30-3 and a feeding element 50-3. An outline of the radiating element 30-3 and the opening 11-3 form a surrounding slot 20-3. In addition, the antenna apparatus 3 may further include a transmission element 60-3. A difference between the embodiment and the first and fifth embodiments is that a geometric shape of the outline of the radiating element 30-3 is different from that of the opening 11-3 of the cavity element 10-3. The geometric shape of the outline of the radiating element 30-3 is a rectangular, but the opening 11-3 is elliptical.

Figure 4:
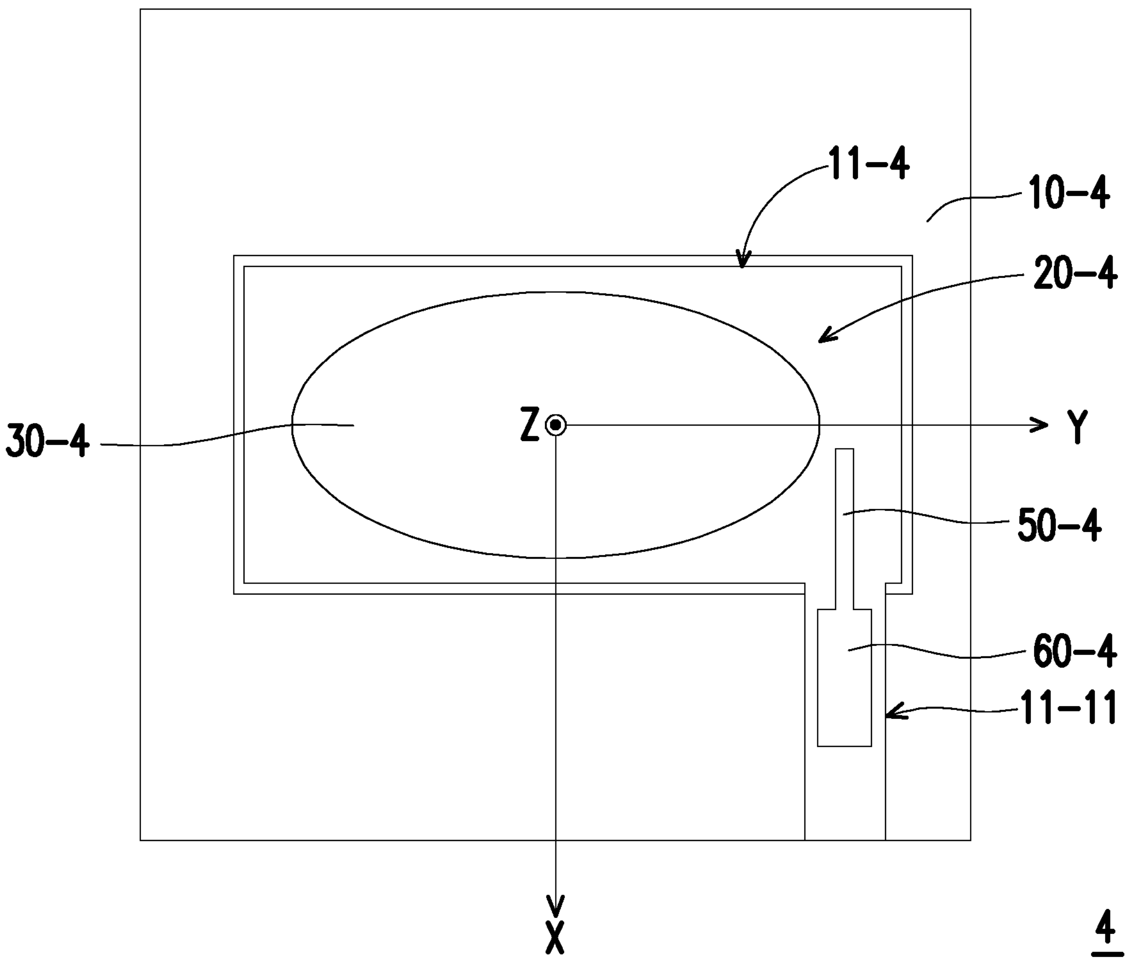
FIG. 4 is a top view of an antenna apparatus according to a seventh embodiment of the disclosure.

FIG. 4 is a top view of an antenna apparatus 4 according to a seventh embodiment of the disclosure. Referring to FIG. 4, the antenna apparatus 4 includes a cavity element 10-4, a radiating element 30-4 and a feeding element 50-4. An outline of the radiating element 30-4 and the opening 11-4 form a surrounding slot 20-4. In addition, the antenna apparatus 4 may further include a transmission element 60-4. A difference between the embodiment and the first and fifth embodiments is that a geometric shape of the outline of the radiating element 30-4 is different from that of the opening 11-4 of the cavity element 10-4. The geometric shape of the outline of the radiating element 30-4 is elliptical, but the opening 11-4 is rectangular.

Figure 5A:
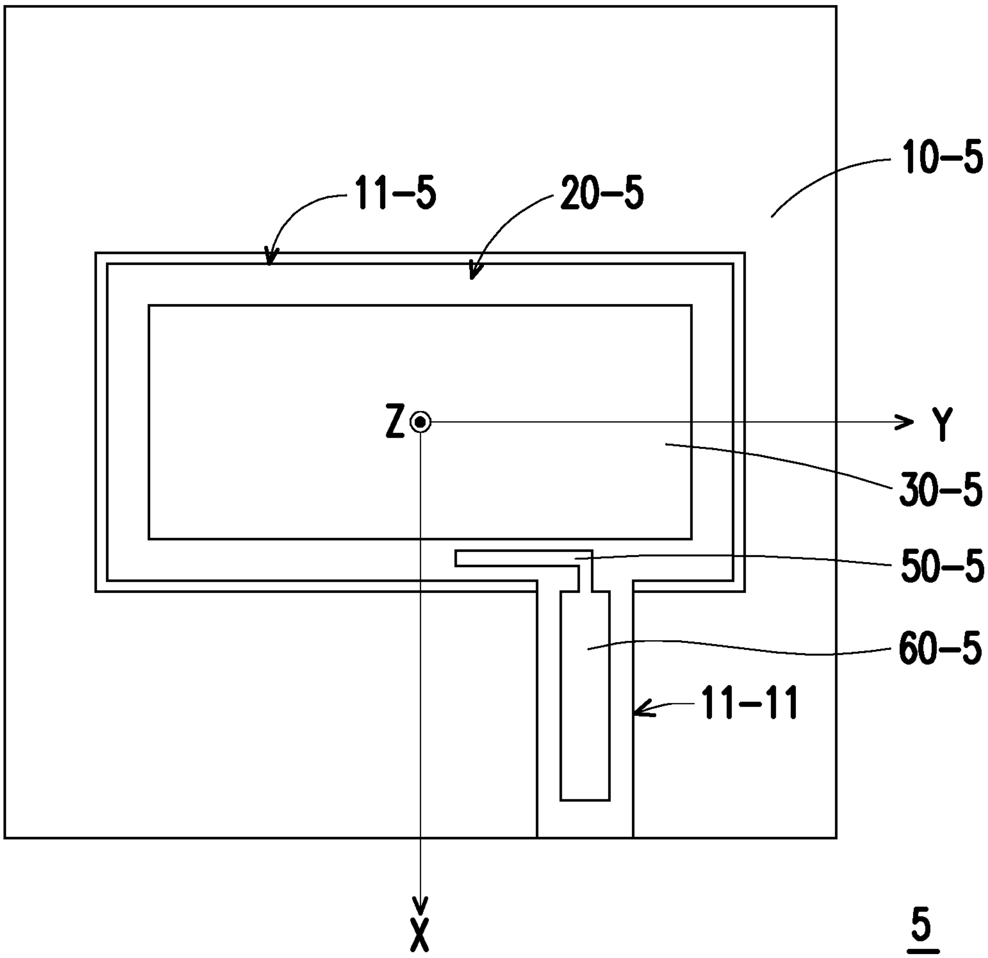
FIG. 5A is a top view of an antenna apparatus according to an eighth embodiment of the disclosure.

FIG. 5A is a top view of an antenna apparatus 5 according to an eighth embodiment of the disclosure. Referring to FIG. 5A, the antenna apparatus 5 includes a cavity element 10-5, a radiating element 30-5 and a feeding element 50-5. An outline of the radiating element 30-5 and the opening 11-5 form a surrounding slot 20-5. In addition, the antenna apparatus 5 may further include a transmission element 60-5. A difference between the embodiment and the first and fifth embodiments is that the feeding element 50-5 forms an L-shaped stub (with a tail end extending toward a central line (taking the X-axis as an example) of an imagining rectangle defined by an external outline of the surrounding slot 20-5).

Figure 5B:
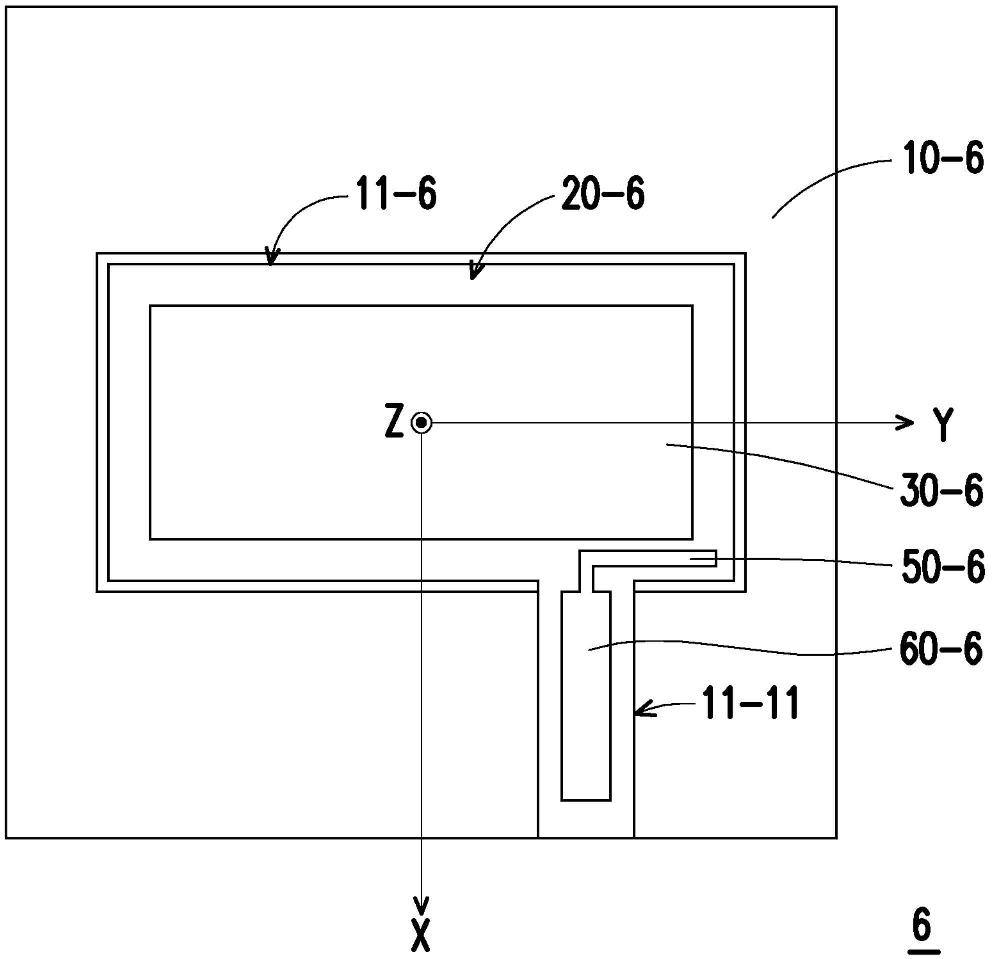
FIG. 5B is a top view of an antenna apparatus according to a ninth embodiment of the disclosure.

FIG. 5B is a top view of an antenna apparatus 6 according to a ninth embodiment of the disclosure. Referring to FIG. 5B, the antenna apparatus 6 includes a cavity element 10-6, a radiating element 30-6 and a feeding element 50-6. An outline of the radiating element 30-6 and the opening 11-6 form a surrounding slot 20-6. In addition, the antenna apparatus 6 may further include a transmission element 60-6. A difference between the embodiment and the first and fifth embodiments is that the feeding element 50-6 forms an L-shaped stub (with a tail end extending away from a central line (taking the X-axis as an example) of an imagining rectangle defined by an external outline of the surrounding slot 20-6).

Figure 5C:
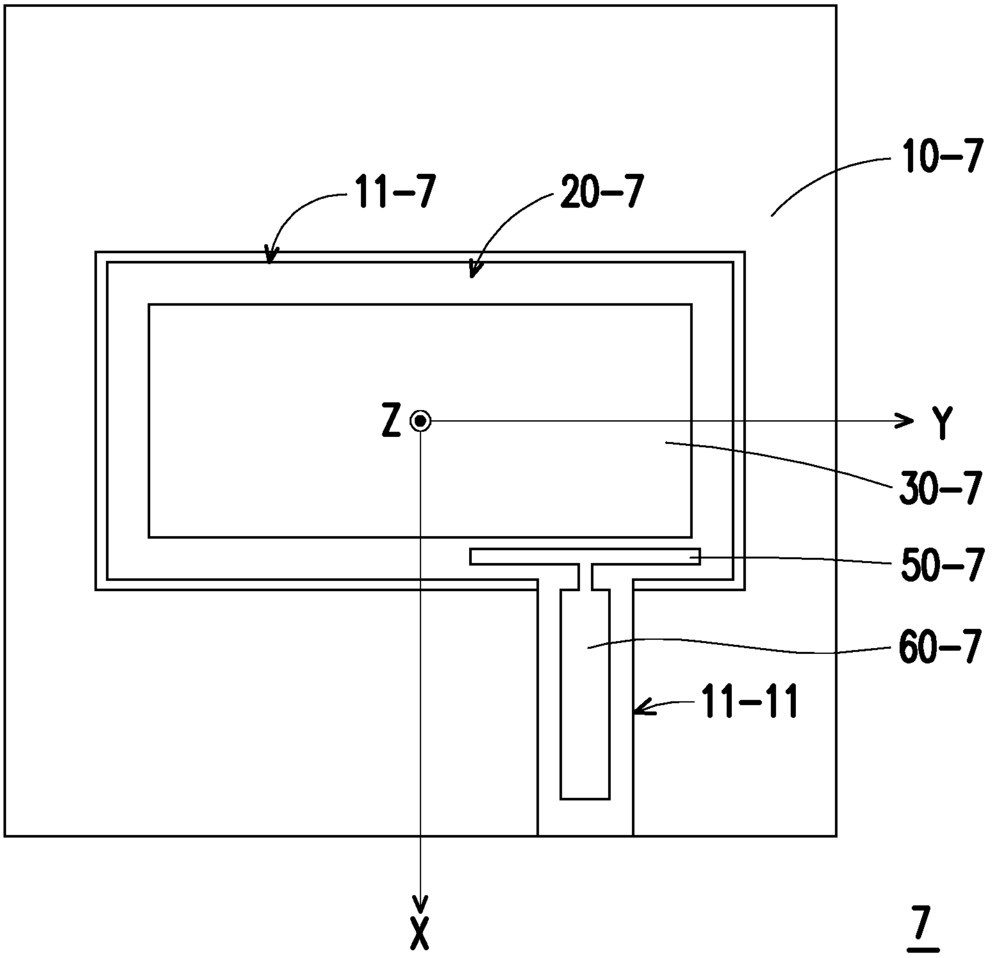
FIG. 5C is a top view of an antenna apparatus according to a tenth embodiment of the disclosure.

FIG. 5C is a top view of an antenna apparatus 7 according to a tenth embodiment of the disclosure. Referring to FIG. 5C, the antenna apparatus 7 includes a cavity element 10-7, a radiating element 30-7 and a feeding element 50-7. An outline of the radiating element 30-7 and the opening 11-7 form a surrounding slot 20-7. In addition, the antenna apparatus 7 may further include a transmission element 60-7. A difference between the embodiment and the first and fifth embodiments is that the feeding element 50-7 forms a T-shaped stub (with two tail ends respectively extending toward and away from a central line (taking the X-axis as an example) of an imagining rectangle defined by an external outline of the surrounding slot 20-7).

It should be noted that the design of the surrounding slot formed between the cavity element and the radiating element of the embodiments of the disclosure may generate two electric field modes with close frequencies, thereby achieving broadband (i.e., non-narrowband) or dual band effects. In addition, the feeding element of the embodiment of the disclosure is a shift feeding design, which also helps to increase a bandwidth.

Figure 6:
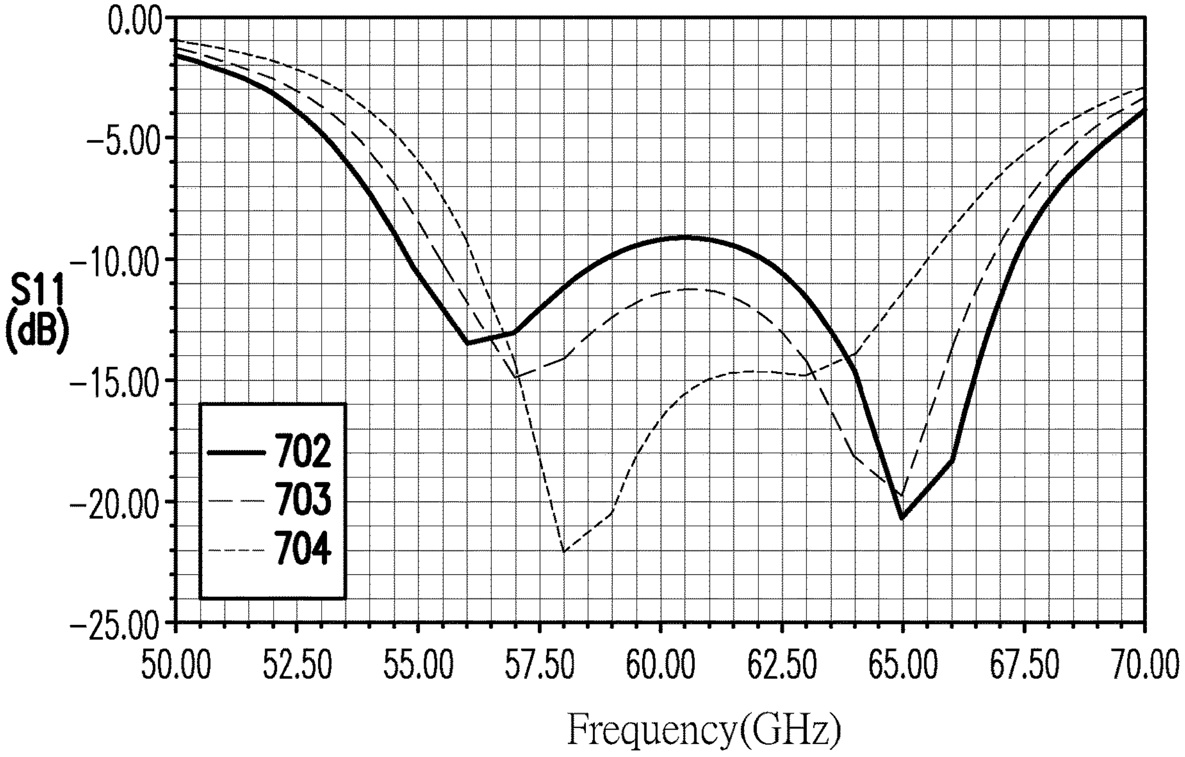
FIG. 6 is an S-parameter diagram of the antenna apparatus according to the first embodiment of the disclosure.

FIG. 6 is an S-parameter diagram of the antenna apparatus according to the first embodiment of the disclosure. Referring to FIG. 6, curves 702, 703, and 704 correspond to different shift distances, where the curve 702 corresponds to the shortest shift distance, and the curve 704 corresponds to the longest shift distance. Taking a bandwidth shown in the curve 703 as an example, compared with centered feeding, i.e., the design without the shift distance, the bandwidth is about to be increased from 3 GHz to 11 GHz. Therefore, if there is the shift distance, the bandwidth may be significantly improved. In addition, the curve 703 has two obvious low points at about 57 GHz and 65 GHz, which correspond to two frequency bands.

Figure 7:
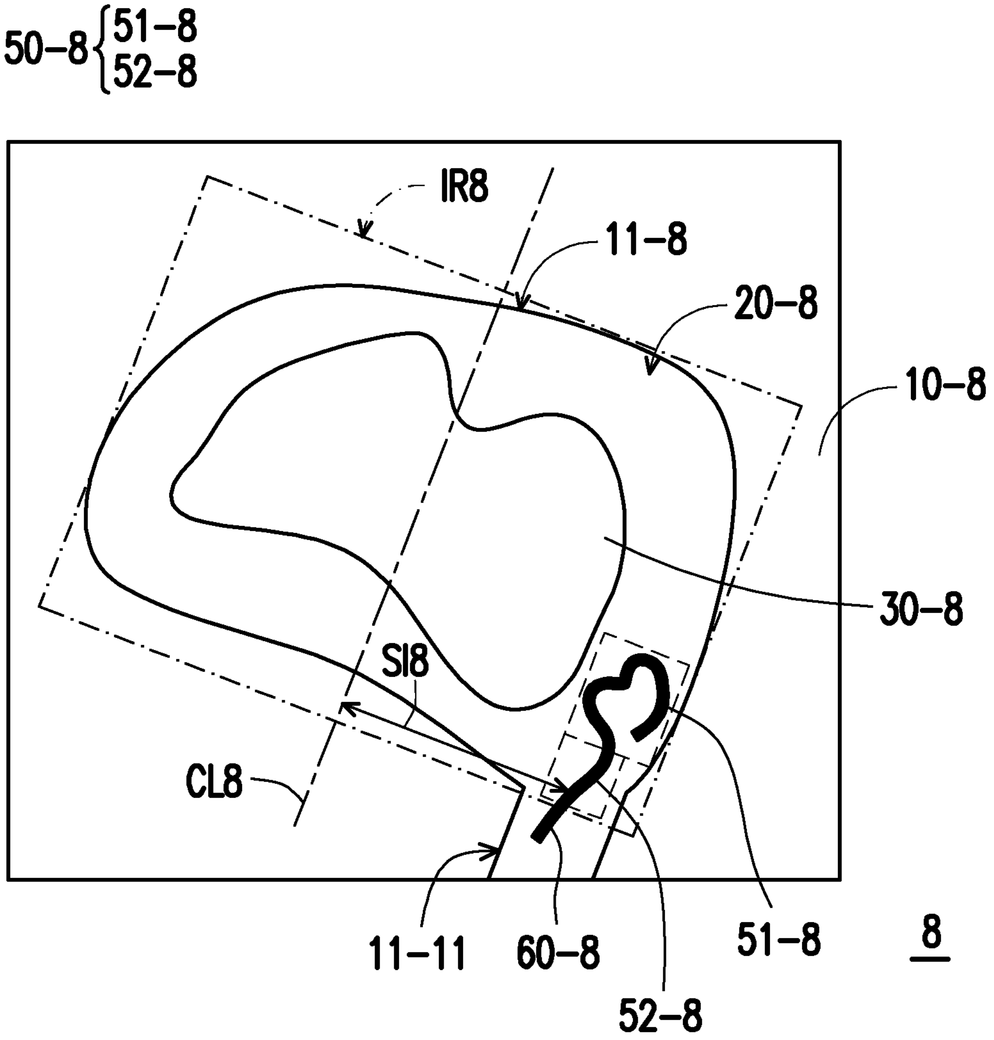
FIG. 7 is a top view of an antenna apparatus according to an eleventh embodiment of the disclosure.

It should be noted that the outlines of the feeding element, the radiating element and the opening in the aforementioned embodiments are all geometric shapes. However, the shapes may still have other variations. FIG. 7 is a top view of an antenna apparatus 8 according to an eleventh embodiment of the disclosure. Referring to FIG. 7, the antenna apparatus 8 includes a cavity element 10-8, a radiating element 30-8 and a feed element 50-8. An outline of the radiating element 30-8 and an opening 11-8 form a surrounding slot 20-8. The feeding element 50-8 includes, but is not limited to, sections 51-8, 52-8. In addition, the antenna apparatus 8 may further include a transmission element 60-8. A difference between the embodiment and the previous embodiments is that the outlines of the radiating element 30-8, the feeding element 50-8, the transmission element 60 8 and the opening 11-8 are all irregular shapes. Anyway, the section 52-8 of the feeding element 50-8 still has a shift distance SI8 from a central line CL8 of an imagining rectangle IR8 covering the surrounding slot 20-8, and a tail end of the section 51-8 of the feeding element 50-8 is an open circuit (not connected to the radiating element 30-8 and a conductive part of the conductive layer M1 (the conductive part of the conductive layer M1 is, for example, the part other than the opening 11-8 and the opening extending portion 11-11)). Therefore, compared with the antenna design with centered feeding, the eleventh embodiment may provide a larger bandwidth.

In summary, in the antenna apparatus of the embodiment of the disclosure, the surrounding slot is formed between the cavity element and the radiating element, and the feeding element implement feeding in an electric field coupling manner and has a shift distance from the central line of the imagining rectangle (i.e., shift feeding), and the radiating element and the feeding element are set on the same conductive layer. Therefore, the parameters used in the antenna design of the embodiment of the disclosure are relatively simple and easy to be optimized. The embodiment of the disclosure may increase a bandwidth to achieve a non-narrowband effect (for example, a dual-bandwidth range, a multi-bandwidth range, or a wide-bandwidth range). The embodiments of the disclosure are less susceptible to the influence of surrounding elements, and isolation between the antenna elements is high. In addition, the cost and manufacturing difficulty of the two conductive layer structure of the embodiment of the disclosure are relatively low.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An antenna apparatus, comprising:
a cavity element, comprising an opening;
a radiating element, located within the opening and disposed at a first conductive layer, and an outline of the radiating element and the opening forming a surrounding slot, wherein an external outline of the surrounding slot is configured to define an imagining rectangle, and the imagining rectangle has four sides respectively abutting against the external outline of the surrounding slot; and
a feeding element, disposed at the first conductive layer and comprising:
a first section, located within the opening, wherein a coupling distance is provided between the first section and the radiating element, and a tail end of the first section is an open circuit; and
a second section, located within the opening, wherein a shift distance is provided between the second section and a first central line of the imagining rectangle.

2. The antenna apparatus according to claim 1, wherein the imagining rectangle comprises two first opposite sides, the first central line is formed at a center of any one of the first opposite sides, the second section extends from one of the two first opposite sides, and the tail end of the first section is not connected to another one of the two first opposite sides.

3. The antenna apparatus according to claim 2, wherein the shift distance is greater than or equal to one-sixteenth of a length of the first opposite side.

4. The antenna apparatus according to claim 2, wherein the imagining rectangle further comprises two second opposite sides, wherein a length of the first opposite side is greater than or equal to a length of the second opposite side.

5. The antenna apparatus according to claim 1, further comprising a transmission element, wherein the cavity element further comprises an opening extending portion, the opening extending portion communicates with the opening, the transmission element is coupled to the second section of the feeding element, and the transmission element is located at the opening extending portion.

6. The antenna apparatus according to claim 1, further comprising a transmission element coupled to the second section of the feeding element, wherein the transmission element comprises a part of metal of the first conductive layer.

7. The antenna apparatus according to claim 1, further comprising a transmission element coupled to the second section of the feeding element, wherein the transmission element is disposed outside the cavity element.

8. The antenna apparatus according to claim 1, wherein the first section and the second section form a straight shape.

9. The antenna apparatus according to claim 1, wherein the feeding element forms an L-shape or a T-shape.

10. The antenna apparatus according to claim 1, wherein a shortest linear distance from the external outline of the surrounding slot to an external outline of the radiating element is configured to define one or a plurality of widths of the surrounding slot, and the width or a greatest one of the widths is smaller than a half of a wavelength of a radio signal of the antenna apparatus.

11. The antenna apparatus according to claim 1, wherein the outline of the radiating element has a same geometric shape as the opening.

12. The antenna apparatus according to claim 1, wherein the outline of the radiating element has a geometric shape different from the opening.

13. The antenna apparatus according to claim 1, further comprising:
a ground portion, disposed at a second conductive layer parallel to the first conductive layer and located at a bottom side of the cavity element.

14. The antenna apparatus according to claim 13, wherein the cavity element is a conductor coupled to the ground portion.

15. The antenna apparatus according to claim 1, wherein the radiating element comprises a patch.

16. The antenna apparatus according to claim 1, wherein the cavity element is defined by at least one conductive wall surrounding the radiating element.

17. The antenna apparatus according to claim 1, wherein the cavity element is defined by a plurality of conductive vias arranged in parallel around the radiating element.

18. The antenna apparatus according to claim 17, wherein the feeding element is configured to transmit a radio signal, and a shortest distance between the conductive vias is less than or equal to one-half of a wavelength of the radio signal.

19. An antenna apparatus, comprising:
a cavity element, comprising an opening;
a radiating element, located within the opening and disposed at a first conductive layer, and an outline of the radiating element and the opening forming a surrounding slot, wherein an external outline of the surrounding slot is configured to define an imagining rectangle, and the imagining rectangle has four sides respectively abutting against the external outline of the surrounding slot; and
a feeding element, disposed at the first conductive layer and comprising:
a first section, located within the opening, wherein a coupling distance is provided between the first section and the radiating element, and a tail end of the first section is separated from the radiating element and the external outline of the surrounding slot; and
a second section, located within the opening, wherein a shift distance is provided between the second section and a first central line of the imagining rectangle.

* * * * *